United States Patent
Farkash et al.

(10) Patent No.: US 9,405,579 B2
(45) Date of Patent: Aug. 2, 2016

(54) SEAMLESS EXTENSION OF LOCAL COMPUTING POWER

(71) Applicant: International Business Machines Corporation, Armonk, NY (US)

(72) Inventors: Ariel Farkash, Shimshit (IL); Abigail Goldsteen, Haifa (IL); Nadav Yosef Har'el, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 13/649,122

(22) Filed: Oct. 11, 2012

(65) Prior Publication Data
US 2014/0109095 A1    Apr. 17, 2014

(51) Int. Cl.
G06F 9/48     (2006.01)
G06F 11/14    (2006.01)
G06F 9/46     (2006.01)
H04L 29/08    (2006.01)

(52) U.S. Cl.
CPC .............. *G06F 9/4856* (2013.01); *G06F 9/461* (2013.01); *G06F 11/1443* (2013.01); *G06F 2209/509* (2013.01); *H04L 67/00* (2013.01)

(58) Field of Classification Search
CPC ....... G06F 8/61; G06F 9/54; G06F 2209/509; H04N 7/173336; H04L 67/00
USPC .................. 709/202, 217; 718/102, 104–105; 719/319
See application file for complete search history.

(56) References Cited

U.S. PATENT DOCUMENTS

| 6,016,516 A * | 1/2000 | Horikiri ............... G06F 9/547 709/203 |
| 6,098,091 A * | 8/2000 | Kisor ............................ 709/202 |
| 6,237,024 B1 * | 5/2001 | Wollrath ............... G06F 9/485 709/203 |

(Continued)

FOREIGN PATENT DOCUMENTS

EP      2369479      9/2011

OTHER PUBLICATIONS

Barak and La'adan, "The MOSIX multicomputer operating system for high performance cluster computing", Institute of Computer Science, The Hebrew University of Jerusalem, Future Generation Computer Systems, vol. 13, Issues 4-5, pp. 361-372, Mar. 1998.

(Continued)

*Primary Examiner* — Lewis A Bullock, Jr.
*Assistant Examiner* — Gilles Kepnang
(74) *Attorney, Agent, or Firm* — Brian M. Restauro; Noah A. Sharkan (57) ABSTRACT

Machines, systems and methods for remotely provisioning computing power over a communications network are provided. The method may comprise selecting one or more tasks being executed on a first computing system to be migrated for execution on a second computing system connected to the first computing system by way of a communications network; determining a first point of execution reached during the execution of at least a selected task on the first computing system prior to the selected task being migrated for execution to the second computing system; migrating the selected task to the second computing system, wherein the second computing system continues to execute the selected task from the first point of execution; and monitoring the connection between the first computing system and the second computing system so that in response to detecting a disconnection, execution of the selected task continues seamlessly.

9 Claims, 7 Drawing Sheets

(56) References Cited

U.S. PATENT DOCUMENTS

| | | | | |
|---|---|---|---|---|
| 6,393,497 | B1* | 5/2002 | Arnold | G06F 9/547 719/315 |
| 6,691,245 | B1* | 2/2004 | DeKoning | G06F 11/2028 714/15 |
| 6,848,105 | B1* | 1/2005 | Belt | G06F 8/61 709/203 |
| 7,210,148 | B2* | 4/2007 | Arnold | G06F 9/5044 709/203 |
| 7,434,087 | B1* | 10/2008 | Singh | G06F 11/1443 714/4.11 |
| 7,467,389 | B2* | 12/2008 | Mukkamala | G06F 9/54 709/219 |
| 8,239,868 | B2* | 8/2012 | Misono et al. | 718/102 |
| 8,271,987 | B1* | 9/2012 | Willeford et al. | 718/104 |
| 8,418,181 | B1* | 4/2013 | Sirota et al. | 718/102 |
| 8,443,367 | B1* | 5/2013 | Taylor et al. | 718/102 |
| 8,683,495 | B1* | 3/2014 | Moore et al. | 719/319 |
| 9,183,066 | B2* | 11/2015 | Arnold | G06F 9/547 |
| 2004/0210907 | A1* | 10/2004 | Lau | G06F 9/54 719/310 |
| 2004/0237088 | A1* | 11/2004 | Miki | G06F 9/505 718/102 |
| 2006/0085824 | A1* | 4/2006 | Bruck | H04N 7/17336 725/86 |
| 2007/0240160 | A1* | 10/2007 | Paterson-Jones et al. | 718/104 |
| 2007/0250835 | A1* | 10/2007 | Kobayashi et al. | 718/102 |
| 2008/0091970 | A1* | 4/2008 | Hanai et al. | 714/4 |
| 2010/0106804 | A1* | 4/2010 | He et al. | 709/219 |
| 2010/0332629 | A1 | 12/2010 | Cotugno et al. | |
| 2011/0252137 | A1 | 10/2011 | Stienhans et al. | |
| 2012/0084355 | A1 | 4/2012 | Locker et al. | |
| 2012/0311580 | A1* | 12/2012 | Emelianov | G06F 9/45558 718/100 |
| 2013/0047165 | A1* | 2/2013 | Goetz et al. | 718/105 |
| 2013/0054734 | A1* | 2/2013 | Bond et al. | 709/217 |
| 2013/0179895 | A1* | 7/2013 | Calder et al. | 718/104 |
| 2013/0212212 | A1* | 8/2013 | Addepalli | G06F 9/461 709/217 |
| 2014/0137125 | A1* | 5/2014 | Hsu | G06F 9/4856 718/102 |

OTHER PUBLICATIONS

Casas et al., "MPVM: A Migration Transparent Version of PVM", Oregon Graduate Institute of Science & Technology, The USENIX Association, Computing Systems, vol. 8, No. 2, 1995.

Thain et al., "Distributed Computing in Practice: The Condor Experience", Computer Sciences Department, University of Wisconsin-Madison, 2004.

Pike et al., "Plan 9 from Bell Labs", New Jersey, Computing Systems, vol. 8 #3, pp. 221-254, 1995.

* cited by examiner

SEAMLESS EXTENSION OF LOCAL COMPUTING POWER

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to extending a computer's computing power by utilizing the resources of other computers.

BACKGROUND

For cost efficiency, most people opt to purchase a computer that has sufficient processing power and memory resources to perform routine tasks. Such purchase, while affordable, may not however fully satisfy the computing needs of the purchaser. That is, the computer may not be sufficiently equipped to perform highly resource intensive tasks, resulting in user dissatisfaction and frustration.

Computing resources may be extended by, for example, connecting a local computer to a peer-to-peer computing grid, where a group of computers collaborate to perform certain tasks. Peer computers must support a similar operating environment (e.g., the same operating system and software platform) for the collaboration to be successful. An additional requirement is typically the enforcement a reciprocal relationship among the peers for sharing resources.

An alternative to the above approach is the use of virtually implemented computing platforms, also referred to as cloud computing. Examples of cloud computing services include: Hardware as a Service (HaaS), Infrastructure as a Service (IaaS) and Software as a Service (SaaS). In cloud computing, specific tasks or services are fully outsourced to so-called virtual machines (VMs) running on host system that are remotely accessible over a communications network.

The solutions noted above require continuous network connectivity between a local computer and the remote hosts and generally result in heavy network traffic until a task is completed. In case of deliberate or inadvertent disconnection between the local computer and the remote host, there may be a loss in the computed results unless the host takes over the responsibility of managing the computing tasks and reporting the results back to the local computer once connection is reestablished.

The connectivity and interaction between the local computer and remote machines is generally not seamless or transparent and may involve the compilation and linkage of software suits with proprietary code libraries that are typically incompatible across various computing platforms. Further, there may be requirements for a local computer to logon to different remote host machines to run different tasks causing inconvenience to a user.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for remotely provisioning computing power over a communications network are provided. The method may comprise selecting one or more tasks being executed on a first computing system to be migrated for execution on a second computing system connected to the first computing system by way of a communications network; determining a first point of execution reached during the execution of at least a selected task on the first computing system prior to the selected task being migrated for execution to the second computing system; migrating the selected task to the second computing system, wherein the second computing system continues to execute the selected task from the first point of execution; and monitoring the connection between the first computing system and the second computing system so that in response to detecting a disconnection, execution of the selected task continues seamlessly.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
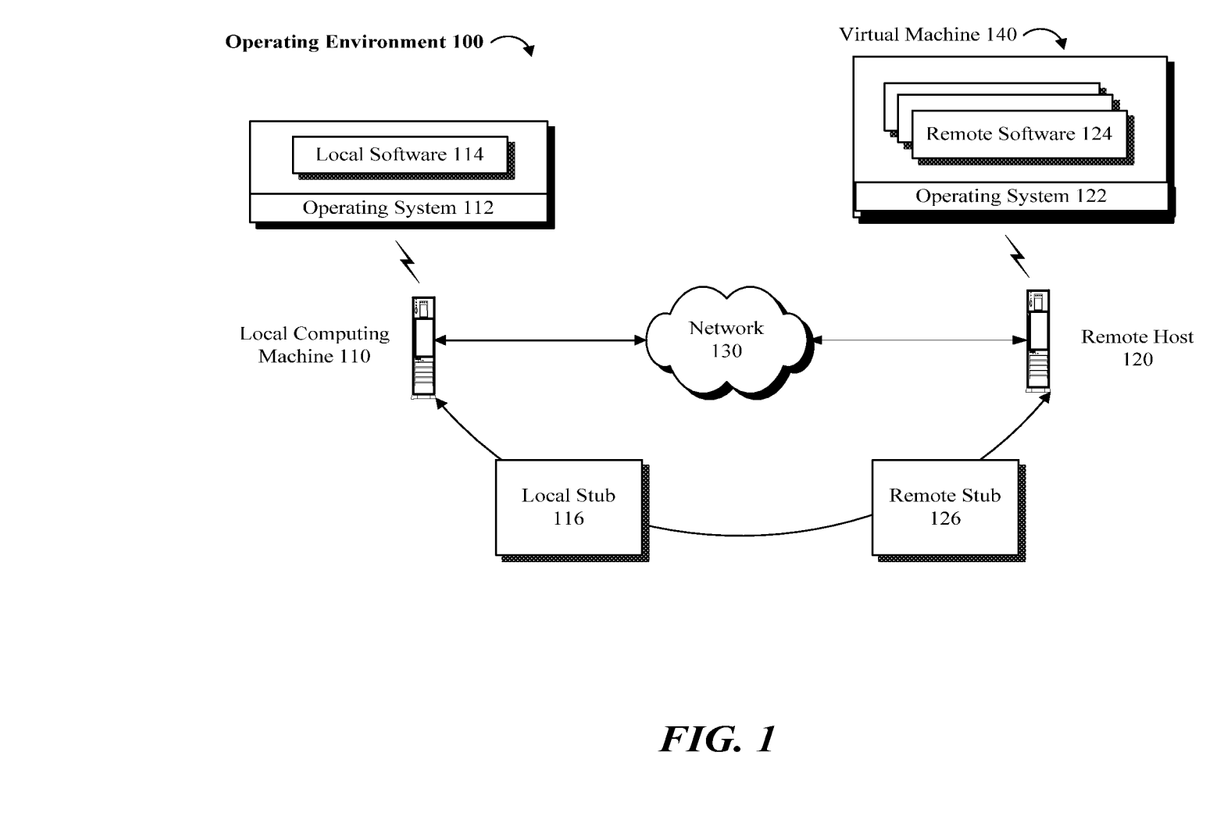
FIG. 1 illustrates an exemplary operating environment in accordance with one or more embodiments, wherein a local machine communicates with a remote host to access the remote resources.

Referring to FIG. 1, an operating environment 100 is provided in which a local computing machine 110 is connected to a remote host 120 over network 130. Local software 114 may be executed on top of operating system 112 which runs on local computing machine 110. The remote host 120 may support one or more VMs 140 to service requests submitted by local computing machine 110. A VM 140 may have an operating system 122 and one or more software 124. In one example, operating system 122 and software 124 may be duplicates of local computer's operating system 112 and local software 114, respectively.

In one embodiment, an initialization process may be implemented to duplicate the local computer's operating system 112 and local software 114 onto a corresponding VM 140, and create managing stubs 116 and 126 to facilitate synchronization of data between local computing machine 110 and remote host 120. The initialization process may be configured to keep local software 114 as installed on the local computing machine 110 intact. In one example, the initialization may result in an update to the local operating system 112 such that the operating system 112 is enabled to migrate one or more processes to a corresponding VM 140 on remote host 120.

Figure 2:
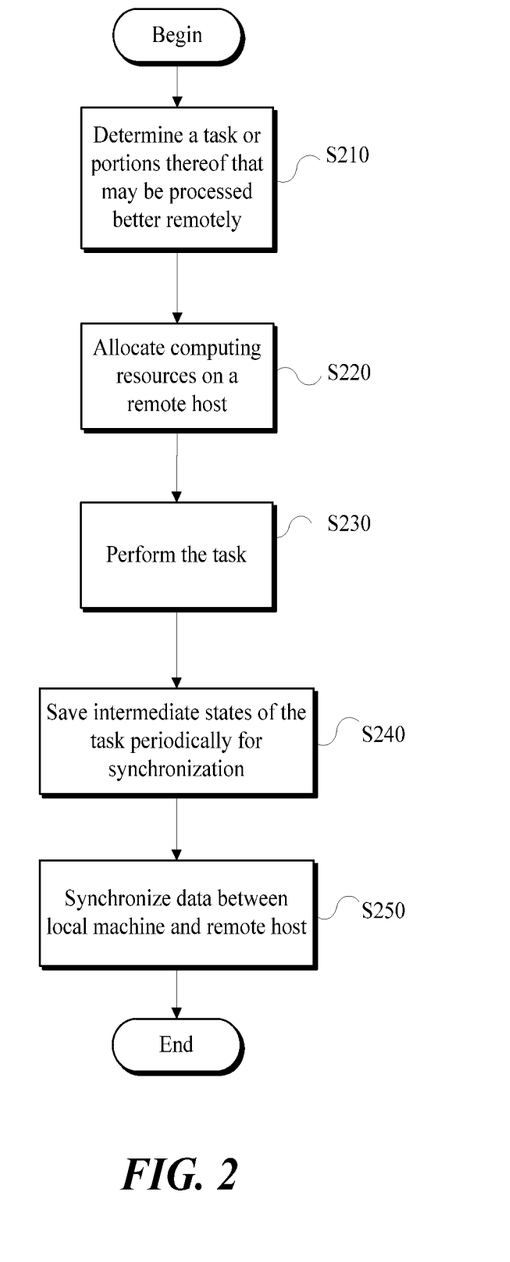
FIG. 2 is an exemplary flow diagram of a method of extending a computer's computing resources.

Referring to FIG. 2, in one embodiment, it may be determined that a process or a task being performed on the local computing machine 110 would be better supported if the responsibility for performing all or part of the task were delegated to virtual machine 140 running on remote host 120 (S210). For example, a monitoring system may determine that a task may benefit from additional computing or memory resources than that available on local computing machine 110. Accordingly, all or some of the computing resources that are desirable to perform all or parts of a target task may be allocated to the remote host 120 (S220).

Once one or more of the resources are allocated, remote host 120 may temporarily take over the responsibility of managing the completion of one or more designated tasks and perform at least part of the task that was previously performed using the resources of local computing machine 110 (S230). In one implementation, the corresponding resources of local computing machine 110 allocated to the task may be freed. Periodically, remote host 120 may save intermediate processing states of the task onto a storage medium, so that the related data may be synchronized with local computing machine 110 (S240).

In one or more embodiments, the data stored on the storage medium may be used to synchronize data associated with performing a target task on local computing machine 110 and remote host 120 (S250). The synchronization data may be used to transfer the responsibility of execution of all or part of the target task back to the local computing machine 110, for example, on demand. If a task transferred from local computing machine to remote host 120 is completed while performed on remote host 120, then remote host 120 synchronizes the results generated from completing the task with the local computing machine 110.

In one embodiment, local computing machine 110 may decide to resume the responsibility for execution of the task before the remote host 120 has completed the task's execution. To facilitate the seamless and transparent migration of the task back to local computing machine 110, remote host 120 may synchronize one or more processing states that have been stored in relation to the task with the local computing machine 110. To avoid data loss due to, for example, inadvertent or unscheduled interruptions in connectivity between local computing machine 110 and remote host 120, a process management protocol may be followed.

In one exemplary implementation, for instance, upon loss of connection between remote host 120 and local computing machine 110, responsibility for task execution is transferred back to the local computing machine 110, upon which remote host 120 releases remote stub 126. As noted earlier, to facilitate a transparent and seamless transfer, remote host 120 may store intermediate execution states for a task and synchronize the states with local computing machine 110. This state transfer process may be configurable so that, for example, remote host 120 synchronizes the states upon designated time intervals (e.g., every five minutes).

Accordingly, in one embodiment, upon disconnection between remote host 120 and local computing machine 110, the local computing machine 110 may pickup and continue executing the task from where remote host 120 had left off, as to the last synchronized state. In other words, in the above exemplary scenario, data loss will be limited to the time interval between the last synchronization and the time of disconnection. In an alternative embodiment, in case of a disruption in connectivity, remote host 120 continues to execute the task until completion. Remote host 120 may continue to save intermediate execution states and any results generated from the execution of a task and synchronize the states and the results with local computing machine 110 when the connection is reestablished.

Thus, depending on implementation, two operational modes may be provided in accordance with one or more embodiments. In a first mode (e.g., synchronous mode) additional computing power or resources of remote host 120 may be utilized as long as local computing machine 110 is connected to the network 130. Upon disconnection, remotely running processes return to the local environment and continue to run locally. In a second mode (e.g., asynchronous mode), the remotely running processes continue to run remotely even after disconnection. Once the connection is reestablished, the remotely running processes are synchronized back with local computing machine 110 and completed process results are copied over.

The above modes enable individual, unskilled or non-technical users to take advantage of additional computing power available remotely without the overhead associated with having to define, configure and manage additional computing environments, or having to deal with managing the running processes or worrying about how disconnecting the computer from the network will affect the then running processes. Thus, one or more embodiments enable migrating processes to and from a local computing machine transparent and seamless.

In one implementation, a management process utilizes local stub 116 and remote stub 126 to manage one or more of the following: the migration, remote execution and synchronization of the tasks that are running on local computing machine 110 and remote host 120. In the synchronous mode, discussed earlier, in case of a controlled disconnection a user may attempt to deliberately disconnect and notify local stub 116 to invoke a process to migrate back any remotely running tasks or processes back to local computing machine 110. If, however, the disconnection is unexpected, task execution continues based on one of the task management protocols provided earlier.

In the asynchronous mode, a process or task may be executed remotely until completion, optionally, without regard to the connection status between local computing machine 110 and remote host 120. A user may have the option to request a process to be migrated back at any given time. In this scenario, local stub 116 and remote stub 126 are synchronized when a process starts, finishes, or is terminated. Upon task completion, remote stub 126 will synchronize with local stub 116 and transfer back the results. If local computing machine 110 is disconnected from network 130, the transfer will occur upon the next synchronization (i.e. when local computing machine 110 connects and local stub 116 initiates synchronization).

In the synchronous mode, read or write commands issued by a process running on remote host 120 may be directed to a storage medium connected to local computing machine 110. Alternatively, the read or write commands may be directed to a storage medium local to remote host 120 and the results may be later copied to the storage medium connected to local computing machine 110 during synchronization. In asynchronous mode, the data may be written to a VM operating on remote host 120 and copied to local computing machine 110 at a predetermined time or event. In either mode, data may be written directly to a shared storage medium accessible by both local computing machine 110 and remote host 120.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3A:
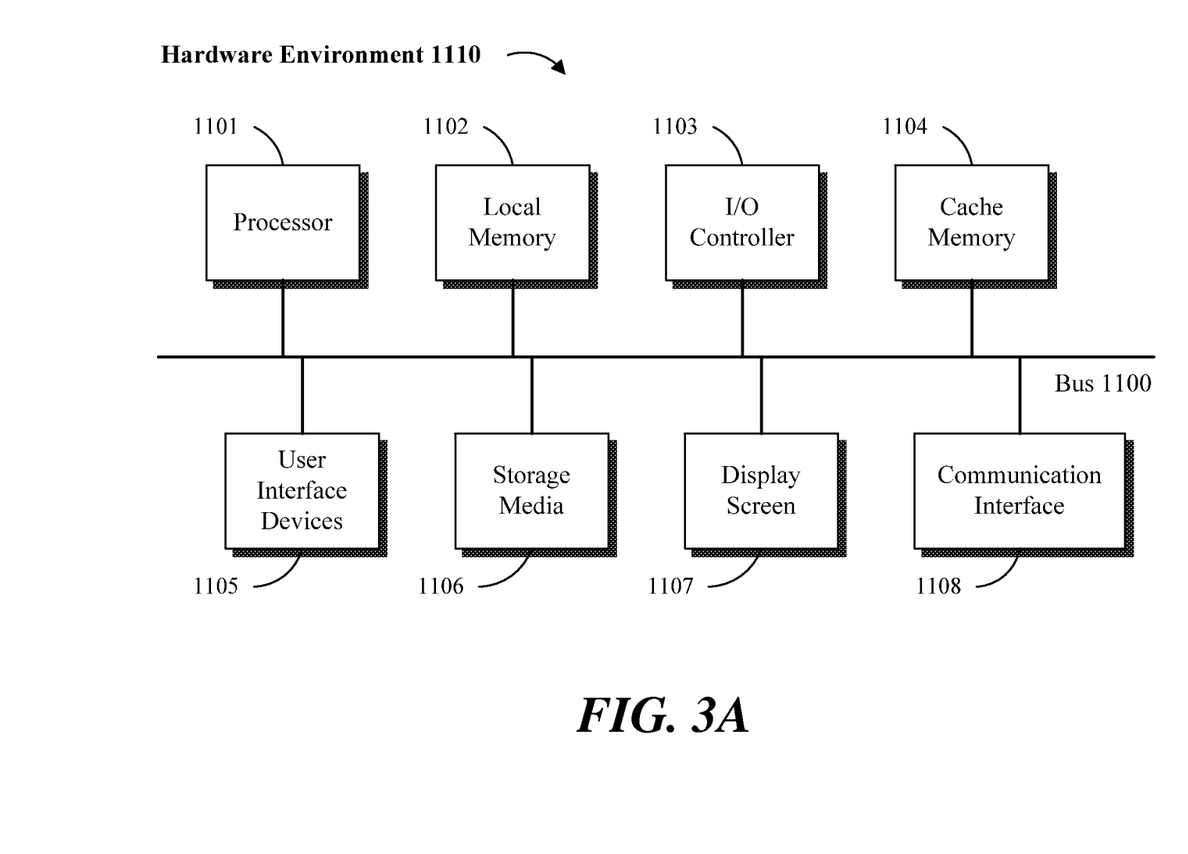
FIGS. 3A and 3B are block diagrams of hardware and software environments in which the disclosed systems and methods may operate, in accordance with one or more embodiments.
Figure 3B:
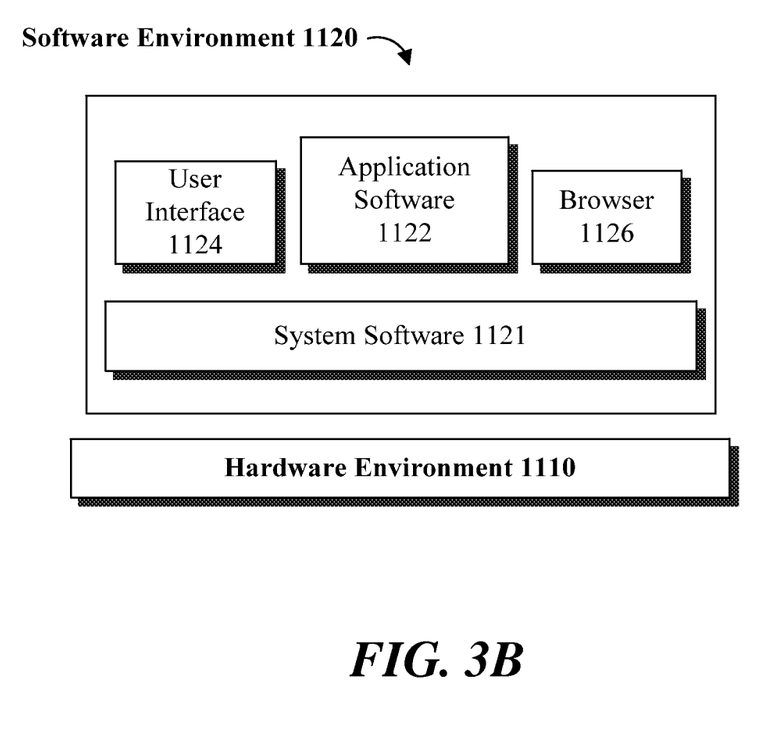

Referring to FIGS. 3A and 3B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statuary subject matter. Examples of a computer readable storage medium may include a semiconductor or solid-state memory, magnetic tape, a removable computer diskette, a random access memory (RAM), a read-only memory (ROM), a rigid magnetic disk, or an optical disk, where appropriate. A computer readable storage medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 3B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Using the on-demand self-service, a cloud consumer may unilaterally provision computing capabilities, such as server time and network storage, as needed automatically without requiring human interaction with the service's provider. Broad network access capabilities may be available over a network and accessed through standard mechanisms that promote use by heterogeneous thin or thick client platforms (e.g., mobile phones, laptops, and PDAs).

Resource pooling allows the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity capabilities may be rapidly and elastically provisioned, in some cases automatically, to quickly scale out and rapidly released to quickly scale in. To the consumer, the capabilities available for provisioning often appear to be unlimited and may be purchased in any quantity at any time. Measured service allows cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Several service models are available, depending on implementation. Software as a Service (SaaS) provides the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) provides the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) provides the capability to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Several deployment models may be provided. A private cloud provides a cloud infrastructure that is operated solely for an organization. It may be managed by the organization or a third party and may exist on-premises or off-premises. A community cloud provides a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud may provide a cloud infrastructure that is made available to the general public or a large industry group and is owned by an organization selling cloud services. A hybrid cloud provides a cloud infrastructure that is a composition of two or more clouds (private, community, or public) that remain unique entities but are bound together by standardized or proprietary technology that enables data and application portability (e.g., cloud bursting for load-balancing between clouds).

Figure 4A:
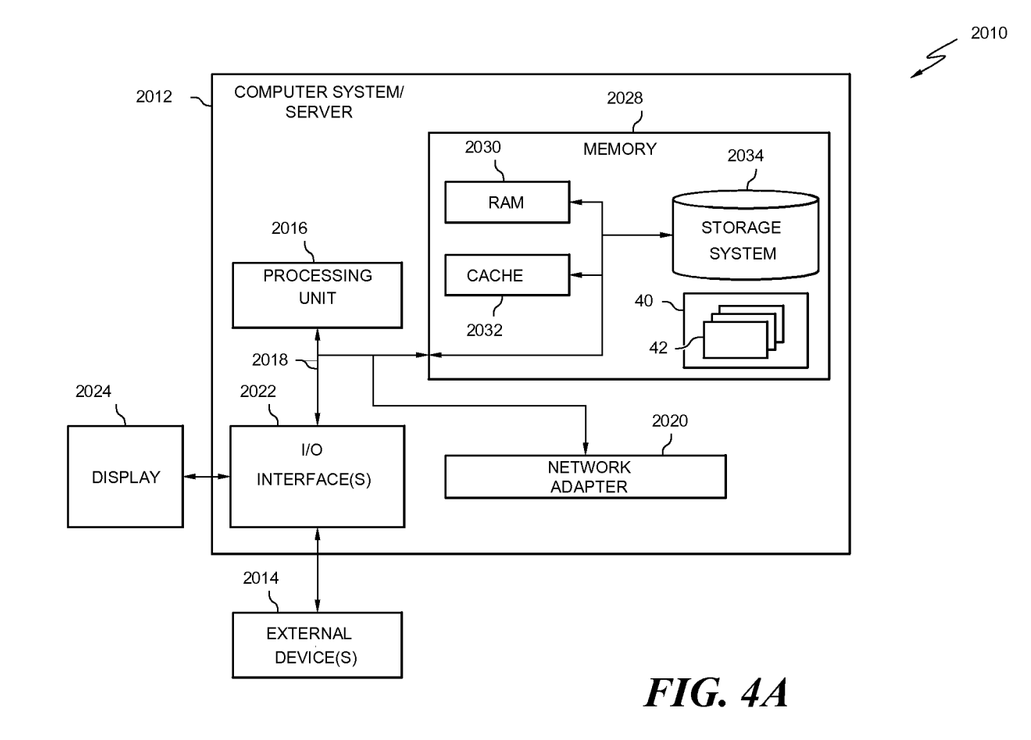
FIGS. 4A, 4B and 4C depict one or more nodes and abstraction model layers in an exemplary network environment that supports a virtual infrastructure, in accordance with one or more embodiments.

A cloud computing environment is service oriented with a focus on statelessness, low coupling, modularity, and semantic interoperability. At the heart of cloud computing is an infrastructure comprising a network of interconnected nodes. Referring now to FIG. 4A, a schematic of an example of a cloud computing node is shown. Cloud computing node 2010 is one example of a suitable cloud computing node and is not intended to suggest any limitation as to the scope of use or functionality of embodiments described herein. Regardless, cloud computing node 2010 is capable of being implemented and/or performing any of the functionality set forth hereinabove.

In cloud computing node 2010, there is a computer system/server 2012, which is operational with numerous other general purpose or special purpose computing system environments or configurations. Examples of well-known computing systems, environments, and/or configurations that may be suitable for use with computer system/server 2012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 2012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4A, computer system/server 2012 in cloud computing node 2010 is shown in the form of a general-purpose computing device. The components of computer system/server 2012 may include, but are not limited to, one or more processors or processing units 2016, a system memory 2028, and a bus 2018 that couples various system components including system memory 2028 to processor 2016.

Bus 2018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2012 typically includes a variety of computer system readable media. Such media may be any available media that is accessible by computer system/server 2012, and it includes both volatile and non-volatile media, removable and non-removable media. System memory 2028 may include computer system readable media in the form of volatile memory, such as random access memory (RAM) 30 and/or cache memory 32.

Computer system/server 2012 may further include other removable/non-removable, volatile/non-volatile computer system storage media. By way of example, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided.

In some instances, the above components may be connected to bus 2018 by one or more data media interfaces. As will be further depicted and described below, memory 2028 may include at least one program product having a set (e.g., at least one) of program modules that are configured to carry out the functions of one or more embodiments.

Program/utility 2040, having a set (at least one) of program modules 42, may be stored in memory 2028 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of one or more embodiments.

Computer system/server 2012 may also communicate with one or more external devices 2014 such as a keyboard, a pointing device, a display 2024, etc.; one or more devices that enable a user to interact with computer system/server 2012; and/or any devices (e.g., network card, modem, etc.) that enable computer system/server 2012 to communicate with one or more other computing devices. Such communication may occur via I/O interfaces 2022. Still yet, computer system/server 2012 may communicate with one or more networks such as a local area network (LAN), a general wide area network (WAN), and/or a public network (e.g., the Internet) via network adapter 2020.

As depicted, network adapter 2020 communicates with the other components of computer system/server 2012 via bus 2018. It should be understood that although not shown, other hardware and/or software components could be used in conjunction with computer system/server 2012. Examples, include, but are not limited to: microcode, device drivers, redundant processing units, external disk drive arrays, RAID systems, tape drives, and data archival storage systems, etc.

Figure 4B:
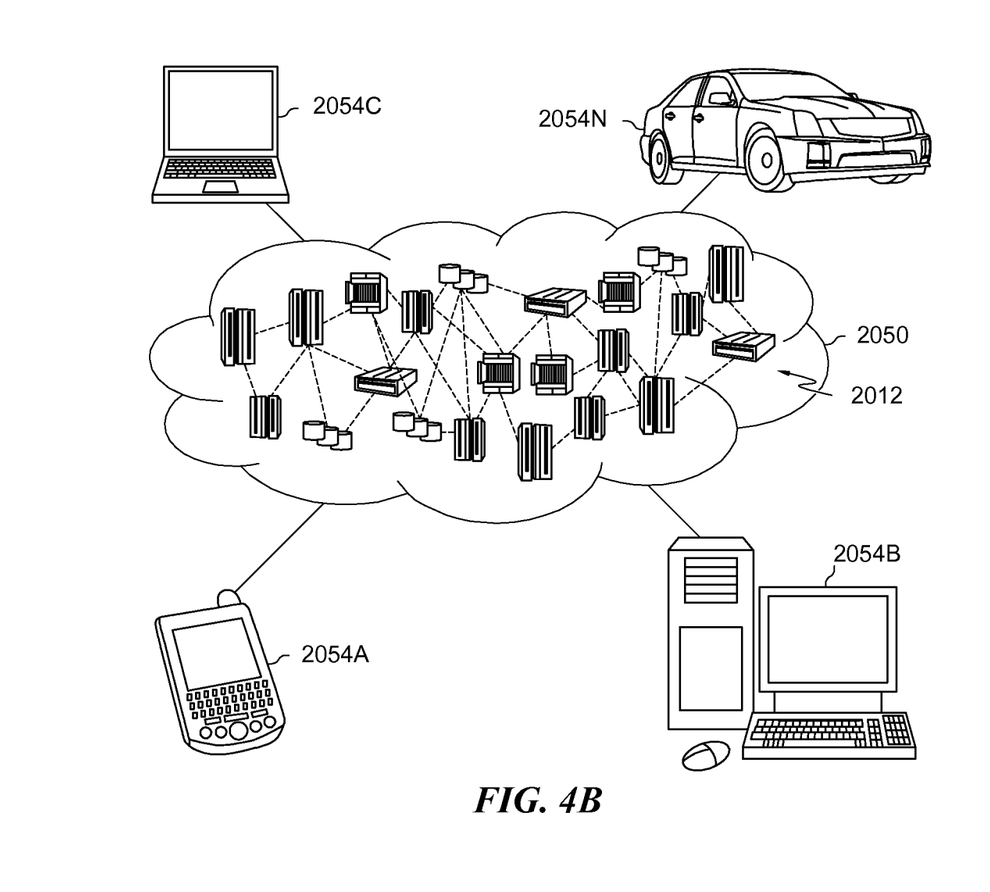

Referring now to FIG. 4B, illustrative cloud computing environment 2050 is depicted. As shown, cloud computing environment 2050 comprises one or more cloud computing nodes 2010 with which local computing devices used by cloud consumers, such as, for example, personal digital assistant (PDA) or cellular telephone 2053A, desktop computer 2053B, laptop computer 2054C, and/or automobile computer system 2054N may communicate.

Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device.

It is understood that the types of computing devices 53A-N shown in FIG. 4B are intended to be illustrative only and that computing nodes 2010 and cloud computing environment 2050 may communicate with any type of computerized device over any type of network and/or network addressable connection (e.g., using a web browser).

Figure 4C:
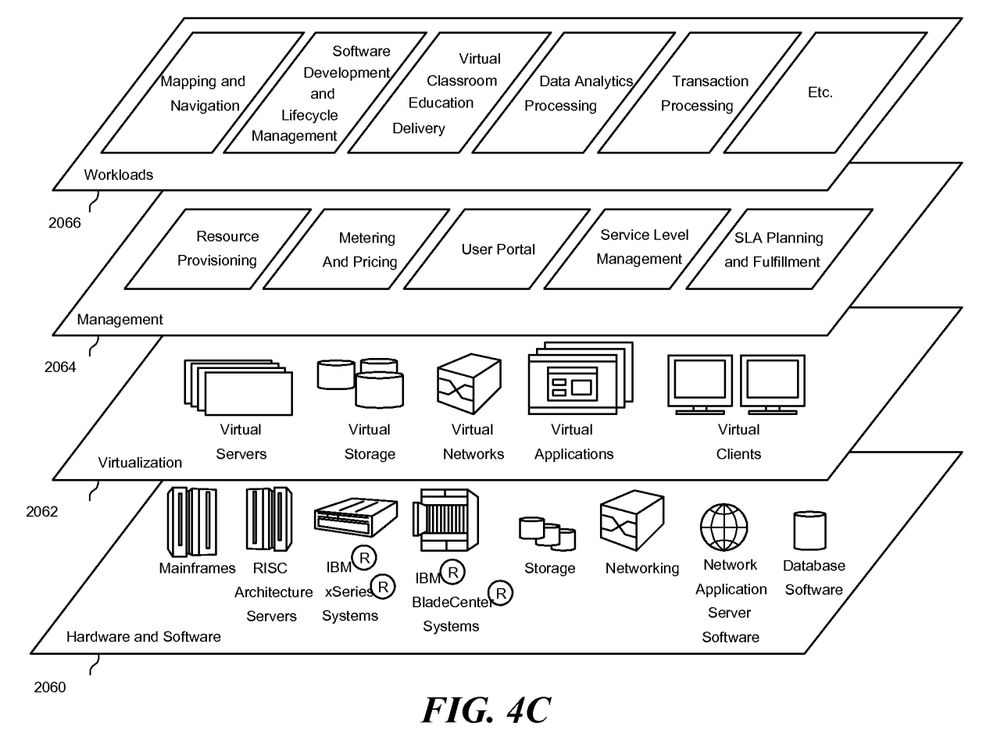

Referring now to FIG. 4C, a set of functional abstraction layers provided by cloud computing environment 2050 (FIG. 4B) is shown. It should be understood in advance that the components, layers, and functions shown in FIG. 4C are intended to be illustrative of one or more embodiments and are not limited thereto. As depicted, the following layers and corresponding functions are provided.

Hardware and software layer 2060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2062 provides an abstraction layer from which the following examples of virtual entities may be provided: virtual servers; virtual storage; virtual networks, including virtual private networks; virtual applications and operating systems; and virtual clients. In one example, management layer 2064 may provide the functions described below. Resource provisioning provides dynamic procurement of computing resources and other resources that are utilized to perform tasks within the cloud computing environment.

Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met.

Service Level Agreement (SLA) planning and fulfillment provide pre-arrangement for, and procurement of, cloud computing resources for which a future requirement is anticipated in accordance with an SLA. Workloads layer 2066 provides examples of functionality for which the cloud computing environment may be utilized. Examples of workloads and functions which may be provided from this layer include: mapping and navigation; software development and lifecycle management; virtual classroom education delivery; data analytics processing; transaction processing; etc.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for remotely provisioning computing power over a communications network, the method comprising:
    selecting one or more tasks being executed on a local computing system to be migrated for execution on a remote computing system connected to the local computing system by way of a connection over a communications network, wherein the remote computing system is in a remote computing environment, wherein the local computing system and the remote computing system respectively include a local stub and a remote stub, and wherein a management process utilizes the local stub and the remote stub to perform a migration, a remote execution, and a synchronization of the one or more selected tasks, wherein the one or more selected tasks have a plurality of designated points of execution throughout the respective one or more selected tasks;
    determining a first point of execution reached during the execution of at least a selected task on the local computing system prior to the selected task being migrated for execution to the remote computing system;
    at the determined first point of execution, synchronizing an intermediate state of the selected task between the local computing system and the remote computing system;
    after the synchronizing of the intermediate state, establishing a responsibility for the selected task using the local stub and the remote stub wherein establishing the responsibility includes selecting one of the local computing system and the remote computing system to continue executing the selected task in the event of a disconnection;
    migrating the selected task to the remote computing system prior to a disconnection based on the established responsibility, wherein the remote computing system continues to execute the selected task from the first point of execution;
    at each of the remaining designated points of execution, performing the steps of:
    synchronizing the intermediate state of the selected task between the local computing system and the remote computing system; and
    reestablishing a responsibility for the selected task using the local stub and the remote stub, wherein reestablishing the responsibility includes selecting one of the local computing system and the remote computing system to continue executing the selected task in the event of a disconnection;
    continuously monitoring a connection between the local computing system and the remote computing system to detect a disconnection;
    responsive to detecting the disconnection between the local computing system and the remote computing system, determining the established responsibility associated with the last designated point of execution prior to the disconnection; and
    executing a task management protocol associated with the determined established responsibility wherein the task management protocol is either an asynchronous mode or a synchronous mode;
    wherein in the asynchronous mode, the selected task is remotely executed from the disconnection point at the remote computing system until completion or the next designated point of execution and in the synchronous mode, the selected task is returned to the local computing system, and locally executed from the disconnection point to completion or the next designated point of execution.

2. The method of claim 1, wherein the remote computing system stores data generated from the execution of the selected task to a data storage medium that is inaccessible by the local computing system, wherein the corresponding data stored on the data storage medium is periodically synchronized with the local computing system over the communications network.

3. The method of claim 1, wherein the remote computing system stores data generated from the section of the selected task to a data storage medium that is accessible by the local computing system over the communications network.

4. A system for remotely provisioning computing power over a communications network, the system comprising:
    one or more processors coupled to memory for executing one or more tasks;
    a logic unit for selecting one or more tasks being executed on a local computing system to be migrated for execution on a remote computing system connected to the local computing system by way of a connection over a communications network, wherein the remote computing system is in a remote computing environment, wherein the local computing system and the remote computing system respectively include a local stub and a remote stub, and wherein a management process utilizes the local stub and the remote stub to perform a migration, a remote execution, and a synchronization of the one or more selected tasks, wherein the one or more selected tasks have a plurality of designated points of execution throughout the respective one or more selected tasks;

a logic unit for determining a first point of execution reached during the execution of at least a selected task on the local computing system prior to the selected task being migrated for execution to the remote computing system;

a logic unit for, at the determined first point of execution, synchronizing an intermediate state of the selected task between the local computing system and the remote computing system;

a logic unit for, after the synchronizing of the intermediate state, establishing a responsibility for the selected task using the local stub and the remote stub wherein establishing the responsibility includes selecting one of the local computing system and the remote computing system to continue executing the selected task in the event of a disconnection;

a logic unit for migrating the selected task to the remote computing system prior to a disconnection based on the established responsibility, wherein the remote computing system continues to execute the selected task from the first point of execution;

a logic unit for, at each of the remaining designated points of execution, performing the steps of: synchronizing the intermediate state of the selected task between the local computing system and the remote computing system; and reestablishing a responsibility for the selected task using the local stub and the remote stub, wherein reestablishing the responsibility includes selecting one of the local computing system and the remote computing system to continue executing the selected task in the event of a disconnection;

a logic unit for continuously monitoring a connection between the local computing system and the remote computing system to detect a disconnection;

a logic unit for, responsive to detecting the disconnection between the local computing system and the remote computing system, determining the established responsibility associated with the last designated point of execution prior to the disconnection; and a logic unit for executing a task management protocol associated with the determined established responsibility wherein the task management protocol is either an asynchronous mode or a synchronous mode;

wherein in the asynchronous mode, the selected task is remotely executed from the disconnection point at the remote computing system until completion or the next designated point of execution and in the synchronous mode, the selected task is returned to the local computing system, and locally executed from the disconnection point to completion or the next designated point of execution.

5. The system of claim 4, wherein the remote computing system stores data generated from the execution of the selected task to a data storage medium that is inaccessible by the local computing system, wherein the corresponding data stored on the data storage medium is periodically synchronized with the local computing system over the communications network.

6. The system of claim 4, wherein the remote computing system stores data generated from the section of the selected task to a data storage medium that is accessible by the local computing system over the communications network.

7. A computer program product comprising a computer readable storage medium having a computer readable program, wherein the computer readable program when executed on a computer causes the computer to:

select one or more tasks being executed on a local computing system to be migrated for execution on a remote computing system connected to the local computing system by way of a connection over a communications network, wherein the remote computing system is in a remote computing environment, wherein the local computing system and the remote computing system respectively include a local stub and a remote stub, and wherein a management process utilizes the local stub and the remote stub to perform a migration, a remote execution, and a synchronization of the one or more selected tasks, wherein the one or more selected tasks have a plurality of designated points of execution throughout the respective one or more selected tasks;

determine a first point of execution reached during the execution of at least a selected task on the local computing system prior to the selected task being migrated for execution to the remote computing system;

at the determined first point of execution, synchronize an intermediate state of the selected task between the local computing system and the remote computing system;

after the synchronizing of the intermediate state, establish a responsibility for the selected task using the local stub and the remote stub wherein establishing the responsibility includes selecting one of the local computing system and the remote computing system to continue executing the selected task in the event of a disconnection;

migrate the selected task to the remote computing system prior to a disconnection based on the established responsibility, wherein the remote computing system continues to execute the selected task from the first point of execution;

at each of the remaining designated points of execution, the computer readable program causes the computer to;

synchronize the intermediate state of the selected task between the local computing system and the remote computing system; and reestablish a responsibility for the selected task using the local stub and the remote stub, wherein reestablishing the responsibility includes selecting one of the local computing system and the remote computing system to continue executing the selected task in the event of a disconnection;

continuously monitor a connection between the local computing system and the remote computing system to detect a disconnection;

responsive to detecting the disconnection between the local computing system and the remote computing system, determine the established responsibility associated with the last designated point of execution prior to the disconnection; and execute a task management protocol associated with the determined established responsibility wherein the task management protocol is either an asynchronous mode or a synchronous mode; wherein in the asynchronous mode, the selected task is remotely executed from the disconnection point at the remote computing system until completion or the next designated point of execution and in the synchronous mode, the selected task is returned to the local computing system, and locally executed from the disconnection point to completion or the next designated point of execution.

8. The computer program product of claim 7, wherein the remote computing system stores data generated from the execution of the selected task to a data storage medium that is inaccessible by the local computing system, wherein the corresponding data stored on the data storage medium is periodically synchronized with the local computing system over the communications network.

9. The computer program product of claim 7, wherein the remote computing system stores data generated from the section of the selected task to a data storage medium that is accessible by the local computing system over the communications network.

\* \* \* \* \*